(No Model.)
J. B. HYDE.
APPARATUS FOR PREPARING AND TREATING PEAT FOR FUEL AND OTHER PURPOSES.
No. 287,679.   Patented Oct. 30, 1883.
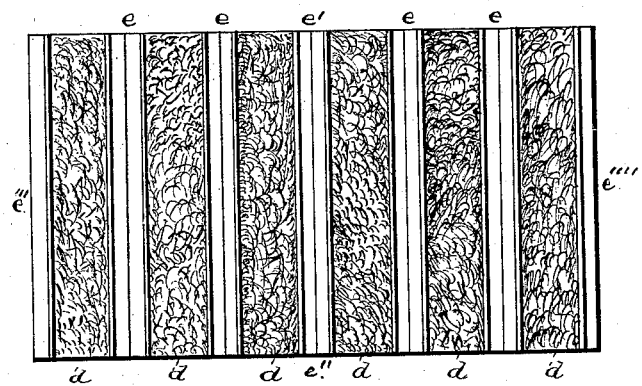
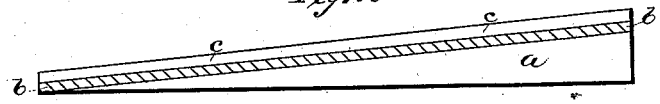
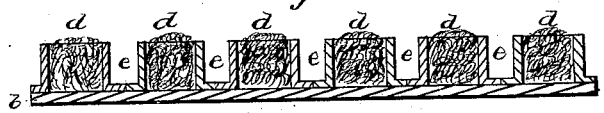
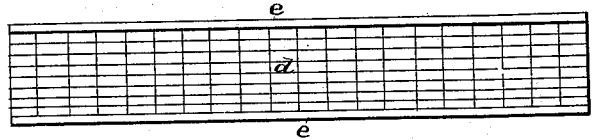
WITNESSES
Chas. R. Burr
Geo. H. Hawley
INVENTOR
J. Burrows Hyde
per O. E. Duffy
Attorney

United States Patent Office.

J. BURROWS HYDE, OF NEW YORK, N. Y.

APPARATUS FOR PREPARING AND TREATING PEAT FOR FUEL AND OTHER PURPOSES.

SPECIFICATION forming part of Letters Patent No. 287,679, dated October 30, 1883.

Application filed May 2, 1883. (No model.)

*To all whom it may concern:*

Be it known that I, J. BURROWS HYDE, a citizen of the United States, residing at New York, in the county of New York and State of New York, have invented certain new and useful Improvements in Preparing and Treating Peat for Fuel and other Purposes, of which the following is a specification, reference being had therein to the accompanying drawings.

Peat in the bed exists in the condition of a water-saturated sponge-like pulpy mass, of dark-brown or blackish color, and consists in minutely-divided particles formed from decomposed woody fiber of vegetable matters that have parted with constituent properties of their organization, except the carbonaceous, which still retains every atom of its original calorific power. Such deposits of stored-up vegetable matter abound throughout the Northern and Middle States of our country as accumulations of ages, varying from a few superficial feet of area to tens of thousands acres, and at varied depths—from a few inches to more than fifty feet. The inducing cause for this partial destruction of vegetable substances—as grasses, mosses, shrubs, trees, &c.—is that they have been excluded from atmospheric oxygen by their constant envelopment in water. It follows that all peat-beds must be underlaid by or be adjacent to springs or other circulating waters, which afford continuous saturation, and when the peat is gathered and dried direct from the bed it will be spongy, light, of great bulk, and highly inflammable, rendering it unfit for commercial uses. If, however, the wet peat direct from the bed be subjected to a rapid kneading or mixing process in a proper apparatus, the mechanical arrangement of the particles causing the sponginess will be broken up, so that the mass will flow from the machine in a smooth, viscid consistence, and as such, when gradually dried, will produce a solid, dense fuel, hard as seasoned oak wood, about the specific gravity of mineral coal, and will not again absorb water under any exposure.

In working a peat-bed three considerations are requisite in locating the works—space or area, facilities for construction and working, and accessibility to road or other means of transportation, to obtain those benefits. First, mark out the working-bed and clear it from all trees, shrubs, and, as far as practicable, roots also. If the surface peat has been frozen, it will be found disintegrated. It should be collected, and may be piled a foot or more high in a continuous wall along or around the boundary of the line marking out the working-bed or designed excavation, as a guard against surface water entering the workings. At any convenient place within said inclosure a well-hole should be cut, five or more feet in diameter, and as deep as practicable, with a view to finally pierce through the peat and into the subsoil. Into this pit erect a drainage-pump, and, if needed, erect a trough and trestle-work, to conduct the waste water to a lower level. The peat may then be excavated and removed by any of the well-known and convenient methods, and conveyed to the manipulating-machine, for which I have obtained separate Letters Patent. This machine should be operated by power, and be located convenient to a steam-engine and under cover. The manipulated peat is conveyed from the manipulator to the drying-floor, which consists in an inclined and graded surface of as large area as practicable by dressing off the ground surface as smoothly and even as possible, as the surface upon which the drying-floor is to be placed. This may be laid upon standards fixed on the ground; or what I prefer to that is a wooden floor upon standards fixed in the ground; but better still is a surface on the graded ground consisting of concrete, asphalt composition, cement, or any other proper composition that can be made smooth, economy of construction being always an essential factor for consideration. All wood used in this process should be well saturated with heated coal-tar or any antiseptic media. The drying-bed being prepared and the peat well manipulated, I lay border-plates consisting of boards about ten feet feet long and of width of six and eight inches, the narrow one firmly nailed against the edge of the wider in an L shape. Those borders are laid in two rows, six feet apart, upon the hard surface from the higher to the lower level, the vertical sides facing each other; then, leaving a space of two feet, a second pair of borders is laid in the same manner, and so on proceed until the entire surface is covered; and my improvements further consist in my method of treating the manipulated peat after it has been laid upon the bed, as will be described. (See drawings.)

Figure 1 represents a plan of an inclined drying-floor, of concrete, with the border-plates and their intermediate spaces filled with beds of peat. Fig. 2 shows a vertical sectional elevation of the same through $e'\ e''$. Fig. 3 shows a transverse section of the same through $e'''\ e'''$.

$a$ represents the graded surface of the ground; $b$, the concrete bed thereon; $c$, the stratum of peat or wooden borders therefor. $d$ shows the beds of peat; $e$, the border-plates and the walks or spaces between them.

Fig. 4 shows a plan of one of the beds in enlarged scale; and Fig. 5, an end section of two beds, with an intermediate walk, upon a still larger scale. The drying-bed having been prepared as described, the manipulated peat is conveyed thereon from the manipulator in trucks and into the spaces between the border-plates, the top being carefully dressed or stricken off, each bed being filled through its entire length. In a day or so a skin-like coating will form over the surface, at which time the bed should be cut through from top to bottom with rotating plates or blades placed loosely upon a shaft, to extend across and be drawn over the bed; or the bed may be cut with any other proper device therefor, cutting the peat into sections about five inches wide. (See Fig. 5.) The bed should then be cut again transversely, the cutters being eight inches apart, as shown at Fig. 4. After the skin-like surface has formed, the peat will shed rain-water directly, and when the cuts are made the sections will shrink and open the seams, leaving the air to penetrate therein, and rain-water readily escapes and runs down the walks to the lower level. When the thus-formed bricks have sufficient tenacity to be lifted, they should be piled up along the upper side of the bed, with circulating air-spaces, and so remain until dry enough for removal to the store-house or otherwise. The broken bricks and all fragmentary particles are reserved for grinding to powder, and used as peat-dust fuel under my Patents Nos. 274,778 and 274,779, granted March 27, 1883.

What I claim, and desire to secure by Letters Patent, is—

In the process of preparing and treating peat for fuel, an improved drying-floor, consisting of a ground or basis of concrete or other similar suitable material, having a gentle slope, on which is laid a smooth cement composition, and having angle-plates set thereon, forming beds or borders to confine the peat, the same separated by spaces to serve for shedding rain, and for foot and track ways, substantially as described.

In testimony whereof I affix my signature in presence of two witnesses.

J. BURROWS HYDE.

Witnesses:
J. H. HARRIS,
S. C. WALKER.